Dec. 18, 1951     D. SAMIRAN     2,578,745
FLOAT VALVE FOR FUEL SYSTEMS
Original Filed Dec. 17, 1948
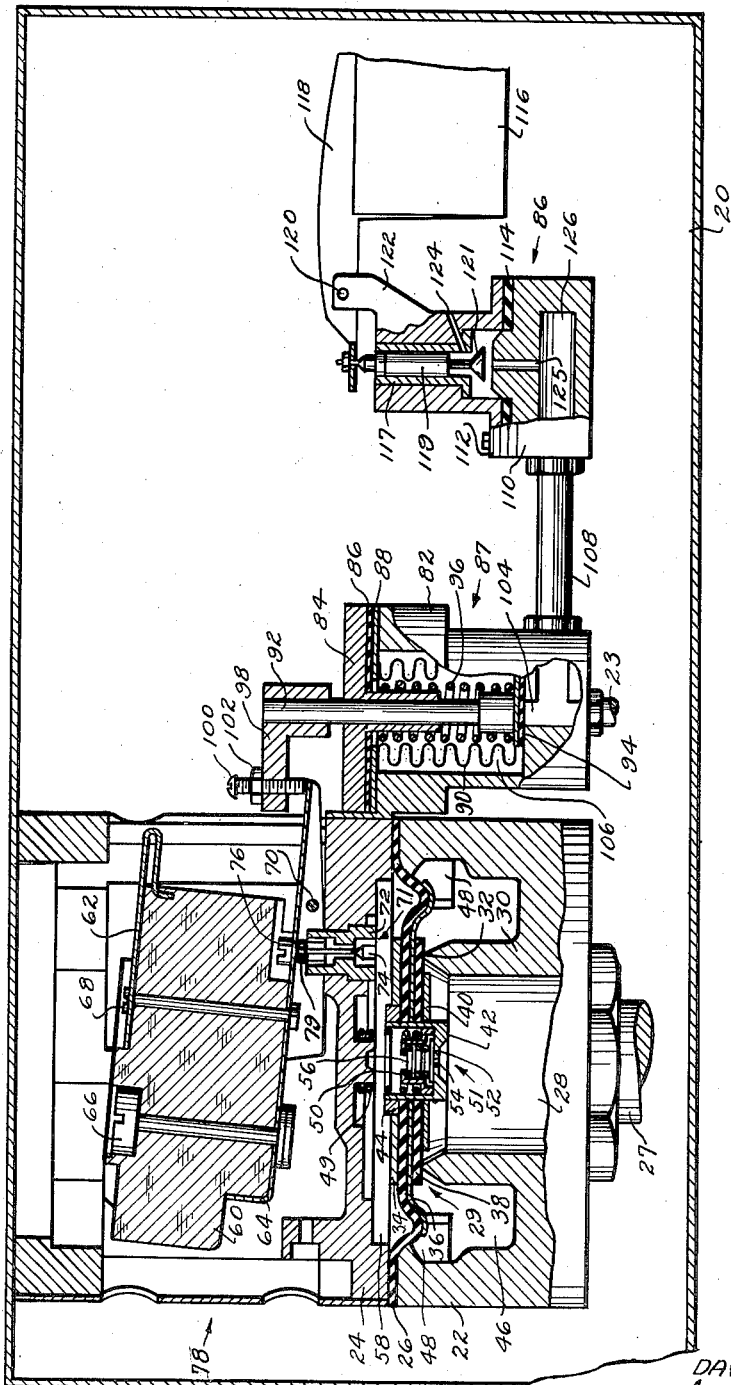
INVENTOR.
DAVID SAMIRAN
BY
ATTORNEYS Patented Dec. 18, 1951

2,578,745

UNITED STATES PATENT OFFICE 2,578,745

FLOAT VALVE FOR FUEL SYSTEMS

David Samiran, Fort Wayne, Ind.

Original application December 17, 1948, Serial No. 65,952. Divided and this application December 28, 1949, Serial No. 135,473

2 Claims. (Cl. 137—104)

(Granted under the act of March 3, 1883, as amended April 30, 1928; 370 O. G. 757)

The invention described in the following specification and claims may be manufactured and used by or for the Government for governmental purposes, without the payment to me of any royalty thereon.

This invention is a division of my copending application Serial Number 65,952, filed December 17, 1948, and is an improvement on my copending application Serial Number 645,694, filed February 5, 1946, now Patent No. 2,491,521.

The invention relates broadly to a float valve adapted to stop inflow of fuel into a tank at a predetermined level.

Float valves of the class to which this invention relates are necessarily of large flow capacity, and, in order that a relatively small float may operate so large a valve, a small bleed valve is provided and arranged to be operated by the float to direct a portion of the pressurized fuel which is entering the tank into a chamber where it is arranged to act against a large diaphragm area to open the main valve.

More specifically the invention comprises hydraulic means whereby, when the tank becomes filled, and the float closes against further inflow, it is hydraulically locked in the closed position until the tank is completely emptied and refueling of the tank is again undertaken.

The object of the invention is to provide a float valve of this kind which is of simple construction and inexpensive yet highly effective for the purpose intended. I attain this object in the device hereinafter described and illustrated in the drawings, wherein, the single figure of the drawing is a vertical axial section through a float valve made in accordance with this invention supported in the top of a fuel tank of an aircraft.

The single figure of the drawing is a cut away view showing the main valve and its float control pilot valve, the locking member for the float and the float controlled release member for the lock.

The float valve shown in the tank 20 in the drawing comprises a lower housing part 22 and an upper housing part 24 clamped together by any suitable means (none shown) with the outer edge of a diaphragm 26 clamped between the two housing parts.

The fuel inlet pipe 27 delivers fuel into the chamber 28 within the hub 30 which carries the seat 32 of the main valve 29. The central portion of the flexible diaphragm 26 lies between metal washers 34 and 36. The flexible disc 38 which engages the valve seat 32 lies between the metal washers 36 and 40. Parts 34, 26, 36, 38 and 40 are all provided with a central opening which fits over the cup 42. Cup 42 has a slight shoulder near the lower end and is externally threaded near the top for the nut 44 by which the parts 34, 26, 36, 38 and 40 are clamped together.

Surrounding the hub 30 is an annular chamber 46 with circumferentially spaced windows 48, whereby, when the disc 38 is raised off the seat 32, fuel may flow from the chamber 28 over the seat 32 into the annular space 46 and out the windows 48 into the fuel tank 20.

Movable vertically in the cup 42 is an inverted stepped cup 50. A coil spring 49 rests on a shoulder of the cup 50 forcing it to the bottom of cup 42 and thereby holding the main valve disc 38 lightly on the seat 32. A small check valve broadly designated by the numeral 51 consists of a disc 52 which lies over a small hole 54 in the bottom of the cup 42 and is held thereon by a light spring 56. The disc 52 is limited in upward movement by engagement with the shoulder in the inverted cup 50.

A pressure chamber 58 is formed by recessing the bottom of the upper housing part 24 whereby, whenever the check valve disc 52 is raised by the pressure in chamber 28 until the pressure equalizes as between the chambers 28 and 58, the main valve disc 38 will be held tightly on the seat 32 by reason of the fact that, although the p. s. i. in both chambers is the same, the area of the chamber 58 greatly exceeds the area of the chamber 28.

Hingedly supported in the upper housing part 24 is a float comprising a cork block 60, reinforced by metal plates 62 and 64 held to the block by bolts 66 and 68. Plate 64 has the edges turned downward to provide bearing for the hinge pin 70.

Tightly fixed in the upper housing part 24 is a bleed valve 71 having a casing 72 containing a needle-valve stem 74 which is guided at the upper end in the casing. An adjusting screw 76 passes through a hole in the metal plate 64 into the top of the valve stem 74. A lock nut 79 on the screw 76 maintains proper adjustment between the float and the needle valve. The flow capacity of the needle valve should be considerably in excess of the flow capacity of the check valve opening 54. Dropping of the float block 60 from the position shown opens the needle valve 74 whereby fuel under pressure may escape from the chamber 58 faster than it may enter through the check valve opening 54, whereby the pressure in the chamber 58 drops, and fuel supplied by the pipe 27 will pass over the valve seat 32 into the annular space 46, through the windows 48 into the tank 20.

The hydraulic lock which has been broadly designated by the numeral 87 consists of a casing 82 supported on the upper housing part 24 and having a cover 84 fastened to the casing by means not shown with a gasket 86 and the flange 88 of a bellows 90 held between the casing and cover. A rod 92 is fast to the inside of the lower closed end of the bellows 90 and has bearing in the cover 84 for vertical sliding movement. A flexible disc 94 is fast on the outside of the lower closed end of the bellows. A coil spring 96 urges axial extension of the bellows. An arm 98 carries an adjusting screw 100 the end of which rests on the outer end of the float reinforcing plate 64, whereby, when the bellows is fully extended and the flexible disc 94 seated, the float will be held locked in the up position as shown. A lock nut 102 maintains the adjustment of the screw 100.

A passageway 104 connects the space 106 around the outside of the bellows 90 by way of the pipe 23 or by way of the pipe 108 to the inlet of the flow level control valve 86.

The flow level control valve 86 comprises a body 110 and cover 112 clamped together on a gasket 114. A float 116 is carried on an arm 118 pivoted at 120 on a bracket 122. A sleeve 117 fixed in the cover 112 provides sliding bearing for the valve stem 119. At the lower end of the valve stem 119 there is a valve head 121. When the tank 20 is less than full, and the float 116 consequently lowered from the position shown, the valve head assumes its raised position wherein it seats and closes the opening 124 against further flow of fuel coming through the pipe 108, chamber 126 and opening 125.

Assuming that the tank 20 is empty and that fuel is to be brought in through the pipe 27, the operation of the float valve herein disclosed is substantially as follows:

When a tank 20 is empty and about to be refueled, the float valve mechanism herein disclosed will appear as shown in the drawing, i. e., main float 60 up, main valve 29 closed, hydraulic lock 87 in the float locking position, the auxiliary float 116 down whereby the auxiliary float valve 86 is closed.

When the incoming fuel under pressure is admitted to the pipes 27 and 23 it cannot immediately enter the tank through the pipe 27 because the main valve 29 is locked in the closed position by the hydraulic lock 87. The pressurized fuel, however, enters the hydraulic lock 87 by way of the smaller pipe 23, and flows through the pipe 108 into the auxiliary float valve 86 which is now closed, whereby the pressurized fuel builds up in the chamber 106 thereby collapsing the bellows 90 against the resistance of the spring 96 and thereby unlocking the hydraulic lock 87 so that the main float 60 may drop and open the needle valve 71, thereby relieving the pressure in chamber 58 whereby the main valve 29 opens and fuel will flow into the tank through the main supply pipe 27.

Fluid flow into the tank 20 will now continue through the main supply pipe 27 until the main float 60 rises and operates the needle valve 71 to pressurize the chamber 58 to close the main valve 29. Simultaneously the auxiliary float 116 rises and opens the auxiliary valve 21 which bleeds pressurized fuel out of the chamber 106 and allows the spring 96 to set the hydraulic lock 87 to again lock the main float 60 in the up position and the main valve 29 in the closed position where it will remain until the next refueling of the tank takes place.

From the foregoing it is clear that where one of a series of tanks, each using a mechanism according to this invention, becomes filled, and the main valve closes against further inflow, it will not open again merely because fuel is withdrawn from the tank but will open only when refueling is initiated, which, in the normal course of operation is when the tanks become empty.

The invention is particularly appropriate in a combined fuel servicing and fuel feeding system where all tanks receive fuel from and feed fuel through a common source since, when any tank is empty it is self isolated from the remainder of the system until all tanks are empty and refueling is initiated.

Having described my invention, I claim:

1. In an aircraft fuel system, a tank, a fuel intake shut-off mechanism which consists of a housing, a main valve in said housing comprising a main valve seat, a main valve disc adapted to be pressed upon said seat to stop fluid flow from the inflow to the outflow side of said main valve, a pressure chamber above said disc adapted to be filled with fluid under pressure to press said disc onto said seat, a small check valve biased for one-way flow from the inflow side of the main valve to said pressure chamber, a bleed valve having flow capacity greater than said check valve connecting said pressure chamber back to said tank, a main float movably supported in said housing and adapted, in a raised position, to close said bleed valve and in a lowered position to open said bleed valve, a hydraulic lock comprising a casing, a locking bar having sliding bearing in said casing and adapted normally to extend from said casing and hold said main float in the raised position, but movable to allow said float to assume the lowered position upon application of pressure to the inside of said casing, conduit means to convey fluid under pressure to the inside of said casing, an auxiliary float, a relief valve operable by said auxiliary float to open when the float is in the raised position and to close when the float is in the lowered position, and a passageway connecting the inside of said casing to said relief valve, whereby, when the auxiliary float is raised and the relief valve therefore open, fluid under pressure entering said casing through said conduit escapes through said relief valve and no pressure builds up in the casing and the main float therefore remains locked in the raised position until the auxiliary float assumes the lowered position whereupon the main float is unlocked and allowed to assume its lowered position.

2. The combination, in an aircraft fuel system, of a tank, a fuel intake shutoff mechanism which consists of a housing, a main valve in said housing comprising a main valve seat, a main valve disc adapted to be pressed upon said seat to stop fluid flow through said main valve into said tank, a pressure chamber above said disc adapted, by the pressure of the incoming fuel, to press said disc onto said seat, a small slow leakage means between the inflow side of the main valve and the said pressure chamber, a bleed valve having flow capacity greater than said leakage means adapted when open to connect said pressure chamber back to said tank, a main float movably supported in said housing and adapted in a raised or lowered position to respectively close or open said bleed valve, a locking means associated with said main float including a member normally holding said main float in a raised position whereby the bleed valve is closed, but operative by pressure of incoming fuel to move to another position to hold said main float in a lowered position whereby said bleed valve is open, conduit means to convey fuel under pressure to said locking means, an auxiliary float, a relief valve operable by said auxiliary float to open when the auxiliary float is in a raised position and to close when the auxiliary float is in a lowered position, and a passageway connecting the locking means to the relief valve, whereby, when the auxiliary float is raised and the relief valve therefore open, fluid under pressure entering said locking means through said conduit escapes through said relief valve and no pressure builds up in the locking means and the main float therefore remains locked in the raised position until the auxiliary float assumes the lowered position, whereupon the main float is unlocked and allowed to assume its lowered position.

DAVID SAMIRAN.

REFERENCES CITED

The following references are of record in the file of this patent:

UNITED STATES PATENTS

| Number | Name | Date |
|---|---|---|
| 2,491,521 | Samiran | Dec. 20, 1949 |